3,300,334
COATING PROCESS FOR GLASS FIBERS
AND PRODUCT
Rex B. Gosnell, San Diego, Calif., assignor to Whittaker
Corporation, a corporation of California
Filed Jan. 21, 1963, Ser. No. 252,802
8 Claims. (Cl. 117—126)

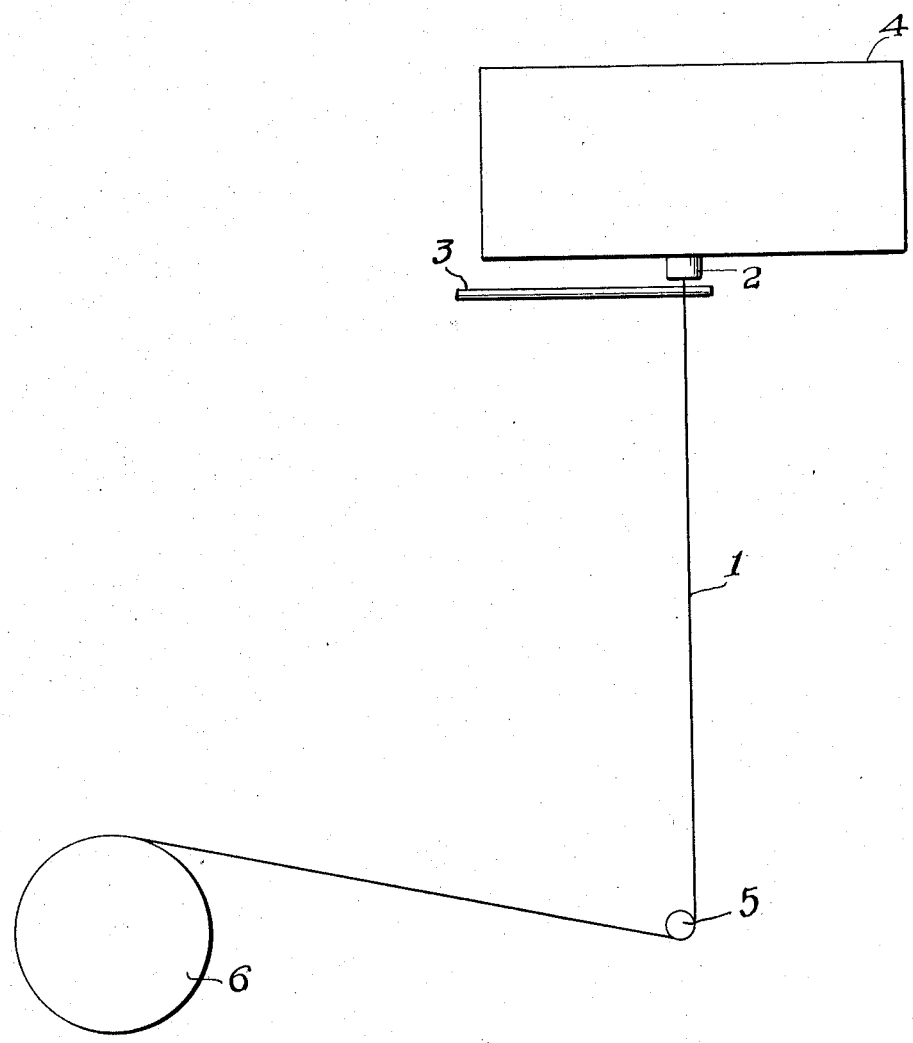

The present invention relates to a coating process and the product produced by this process. More particularly, the present invention relates to a process for coating glass fibers with fusible polybenzimidazoles.

The art of coating glass fibers with various polymers has developed substantially in recent years. Many various approaches have been employed with varying degrees of success. For example, glass fibers have been coated in polymer solutions, molten polymer and powdered polymer. In order to obtain proper adhesion of the polymer to the glass fiber, it has generally been found necessary to employ an intermediate coating known to those skilled in the art as a sizing. Typical sizing materials include starch, hydrocarbon oils, silicone oils, vinyl silanes and metallic complexes. However, in many environments these sizings are distinctly disadvantageous and have been found to be the weakest element in the coated fiber structure. For example, when a coating which is resistant to elevated temperatures is used, it has been found that conventional sizings which are not stable at elevated temperatures are an important factor in reducing the strength of articles fabricated from the coated fibers when these articles are exposed to elevated temperatures.

The desirability of a sizing which is stable at elevated temperatures and/or of a coated glass fiber having no sizing at all is obvious.

Thus, it is a principal object of the present invention to provide a process for coating a glass fiber with a polymer in such a manner that the polymer may function either as a high temperature resistant sizing or as the polymeric constituent in a glass fiber-polymer composite and the products produced thereby.

It is another object of the present invention to provide a process for coating glass fibers with polybenzimidazoles and the products produced thereby.

It is a further object of the present invention to provide a process for coating glass fibers comprising drawing a glass fiber in the semi-molten state over a fusible polybenzimidazole.

Other objects and advantages of the present invention, it is believed, will be apparent from the following detailed description of specific embodiments thereof when read in connection with the drawing.

Briefly, the present invention comprises a process for coating glass fibers with fusible polybenzimidazoles. In the preferred embodiment of this invention, the glass fibers in the semi-molten state are drawn over a solid rod of fusible polybenzimidazoles. As the fiber passes in contact with the polymer rod, the polymer melts and coats the hot fiber. The thickness of coating can be controlled by the velocity of the fiber in the coating zone. The polymer rod is urged into contact with the fiber by any suitable means, e.g., a spring. If desired, the polymer coating may then be cured by procedures which will be more fully described below. It is to be understood that the present invention includes within its scope the products produced by the process of the present invention.

A relatively recent development in the field of condensation polymers has been the production of substantially infusible and non-adhesive polybenzimidazoles, e.g., Marvel and Vogel, J. Poly. Sc., vol. L, page 11 (1961), and Patent No. 2,895,948. While these polybenzimidazoles have been found useful in a limited number of environments where substantially infusible molded articles are desirable, it has not been found possible to use these polymers in melt coating processes because of their substantial infusibility and because they are substantially non-adhesive.

The present invention overcomes these difficulties by using polybenzimidazoles which are fusible at the temperature of glass fibers in the semi-molten state and which are adhesive. These polybenzimidazoles are produced by a process comprising condensation of an aromatic tetramine and a diphenyl ester of an aromatic dicarboxylic acid to a degree short of substantial infusibility. For example, a suitable polybenzimidazole may be produced by condensing 3,3'-diaminobenzidine and the diphenyl esters of isophthalic, terephthalic or diphenic acids, diphenyl 3,5-pyridine dicarboxylate and diphenyl naphthalene-1,6-dicarboxylate. Thus, it will be apparent to those skilled in the art that single ring, multi-ring, fused ring and heterocyclic aromatic diphenyl esters may be used to produce a suitable fusible polybenzimidazole for use in the process of the present invention.

The fusibility of these polybenzimidazoles may be controlled by controlling the degree of polymerization. Only routine experimentation is required to determine the degree of polymerization desirable for a polybenzimidazole suitable for use in the present invention. The fusibility of the polymers used in the present invention renders them capable of wetting the surface to which they are to be bonded. In general, but not by way of limitation, it has been found that polybenzimidazoles having an inherent viscosity of about 0.05 in a 0.5% solution in dimethyl sulfoxide and a fusion temperature in the range of about 110° C. to about 135° C. are particularly suitable for use in the present invention. However, any polybenzimidazole which is sufficiently fusible at the temperature of a semi-molten glass fiber to effectively coat the fiber is suitable for use in the present invention.

Referring now to the drawing, this drawing illustrates glass fiber 1 issuing from bushing 2. Positioned adjacent to and spaced from bushing 2 is fusible polybenzimidazole rod 3. The bushing 2 is fed with molten glass 4 in a conventional manner. After the glass fiber has been in contact with polybenzimidazole rod 3 and has been coated with this polymer, it passes over guide 5 and is collected on a suitable means 6. The polybenzimidazole rod 3 is positioned with respect to bushing 2 such that the glass fiber is in the semi-molten state when it comes into contact with rod 3. This relative location is important since the glass fiber must have sufficient strength such that it will not disintegrate when it comes into contact with rod 3 and must also be at a sufficiently high temperature such that efficient coating is accomplished.

The present invention is further illustrated by the following examples, in which all parts are by weight unless otherwise stated.

*Example 1*

6.42 parts of 3,3'-diaminobenzidine and 9.54 parts of diphenyl terephthalate were mixed in a flask and the system then purged with nitrogen. The flask was immersed in a silicone oil bath at 262° C. and heated for 8.5 minutes at 256–260° C. The product was cooled to room temperature under vacuum and formed a solid yellow cake.

There was obtained 13.7 parts of polymer which fused at 160–170° C. and had an inherent viscosity of 0.051 as a 0.5% solution in dimethyl sulfoxide, corresponding to a degree of reaction of 33.6%.

Example 2

The polymer produced according to Example 1 was formed into a rod and positioned adjacent to a glass fiber-forming bushing as illustrated in the drawing. Glass fibers were then drawn from the bushing and brought into contact with one end of the polymer rod. The rod was positioned such that it contacted the glass fiber while the glass fiber was in the semi-molten state. The glass fiber was thus coated with polybenzimidazole.

As the process continued, the fiber caused a groove to be formed in the polymer rod and the rod was continually urged into contact with the fiber. It was found that the resulting product was a coated fiber and that the coating had excellent adhesion to the fiber.

If desired, the polybenzimidazole coating may be cured and post-cured. Curing may be accomplished at an elevated temperature under pressure, e.g., at 325° C. and a pressure at 500 p.s.i. for one hour. After cooling to room temperature, post-curing may be accomplished at reduced pressure and elevated temperature, e.g., at 400° C. in a vacuum for 6 hours.

The process of the present invention may be practiced such that only a thin coating is imparted to the glass fiber which coating functions effectively as a sizing. When this is done, the sized fiber may be combined with any suitable polymer to form a glass fiber reinforced article. The polybenzimidazole sizing provides excellent adhesion between the additional polymer and the glass fiber, but, in contrast to conventional sizings, is not subject to thermal degradation and thus is not a source of weakness in the composite article.

Alternatively, the polybenzimidazole coating may be formed to a thickness sufficient to permit use of the coated fibers to form a composite material having high strength and excellent high temperature stability.

For example, representative life expectancies of coated fibers produced according to the present invention are: 1000 hours at 550° F., 100 hours at 700° F. and 5 hours at 1000° F. It will be readily apparent to those skilled in the art that this high temperature stability far surpasses that of conventional sizings.

Thus, among the functions which the polybenzimidazole coatings of the present invention perform are a thermally stable coating which prevents abrasion, a heat stable sizing which improves the adhesion of resin systems when the coated fibers are used in composite structures, excellent protection against permeation by water thus reducing strength losses of the glass fiber known to occur even from atmospheric water and, as a thicker coating, the polymer constituent of a composite comprising glass fibers and polybenzimidazoles. The uses of such coated fibers include insulating materials, temperature resistant coverings, components in laminated structures, etc.

Having fully described the present invention, it is to be understood that it is not to be limited to the details set forth, but is of the full scope of the appended claims.

I claim:

1. A process for coating glass fibers comprising bringing a glass fiber into contact with a fusible solid polybenzimidazole while said glass fiber is in the semi-molten state, said polybenzimidazole being sufficiently fusible to effectively coat said fiber, allowing said semi-molten fiber to remain in sliding contact with said polybenzimidazole for sufficient time to allow said fiber to transfer sufficient heat to said polybenzimidazole for said polybenzimidazole to fuse and coat said fiber, and removing said fiber from said polybenzimidazole.

2. A process for coating glass fibers comprising bringing a glass fiber into contact with a solid rod of fusible polybenzimidazole while said fiber is in the semi-molten state, said polybenzimidazole being fusible at the temperature of said semi-molten fiber, allowing said semi-molten fiber to remain in sliding contact with said polybenzimidazole for sufficient time to allow said fiber to transfer sufficient heat to said polybenzimidazole for said polybenzimidazole to fuse and coat said fiber, and removing said fiber from said polybenzimidazole.

3. A process for coating glass fibers comprising bringing a glass fiber into contact with a solid rod of fusible polybenzimidazole while said fiber is in the semi-molten state, said polybenzimidazole being sufficiently fusible at the temperature of said semi-molten fiber to effectively coat said fiber, allowing said semi-molten fiber to remain in sliding contact with said polybenzimidazole for sufficient time to allow said fiber to transfer sufficient heat to said polybenzimidazole for said polybenzimidazole to fuse and coat said fiber, and removing said fiber from said polybenzimidazole.

4. A process comprising drawing a glass fiber from a bushing, bringing said glass fiber into contact with a solid rod of fusible polybenzimidazole while said fiber is in the semi-molten state, said polybenzimidazole being sufficiently fusible at the temperature of said semi-molten fiber to effectively coat said fiber, allowing said semi-molten fiber to remain in sliding contact with said polybenzimidazole for sufficient time to allow said fiber to transfer sufficient heat to said polybenzimidazole for said polybenzimidazole to fuse and coat said fiber, and removing said fiber from said polybenzimidazole.

5. A process for coating glass fibers comprising bringing a glass fiber into contact with a fusible solid polybenzimidazole while said glass fiber is in the semi-molten state, said polybenzimidazole being sufficiently fusible at the temperature of said semi-molten fiber to effectively coat said fiber, allowing said fiber to remain in contact with said polybenzimidazole for a sufficient time for said polybenzimidazole to fuse and coat said fiber, withdrawing said fiber from said polybenzimidazole and then curing said polybenzimidazole by subjecting said polybenzimidazole to a temperature of at least about 325° C.

6. An article comprising a glass fiber coated with a polybenzimidazole prepared by condensing an aromatic tetramine and a diphenyl ester of an aromatic dicarboxylic acid, said glass fiber and said polybenzimidazole being in abutting relation.

7. An article comprising a glass fiber coated with a polybenzimidazole prepared by condensing an aromatic tetramine and a diphenyl ester of an aromatic dicarboxylic acid.

8. The proces of claim 1 wherein said polybenzimidazole has an inherent viscosity of about 0.05 as measured in a 0.5% solution in dimethyl sulfoxide and a fusion temperature in the range of about 100° C. to about 135° C.

References Cited by the Examiner

UNITED STATES PATENTS

| | | | |
|---|---|---|---|
| 1,383,740 | 7/1921 | Meyer | 177—120 |
| 2,491,889 | 12/1949 | Bennett et al. | 117—126 |
| 2,676,898 | 4/1954 | Folger et al. | 117—126 |
| 2,699,415 | 1/1955 | Nachtman | 65—3 X |
| 2,895,789 | 7/1959 | Russell | 65—3 |
| 2,895,948 | 7/1959 | Brinker et al. | 260—78.4 |
| 3,018,267 | 1/1962 | Steckler et al. | 117—124 X |

DONALL H. SYLVESTER, *Primary Examiner.*

C. E. VAN HORN, R. L. LINDSAY,
*Assistant Examiners.*